(12) United States Patent
Skrenta et al.

(10) Patent No.: US 9,405,732 B1
(45) Date of Patent: Aug. 2, 2016

(54) SYSTEM AND METHOD FOR DISPLAYING QUOTATIONS

(75) Inventors: Richard Skrenta, San Carlos, CA (US); Keith Peters, San Francisco, CA (US); Steven Rubinstein, San Mateo, CA (US)

(73) Assignee: TOPIX LLC, Palo Alto, CA (US)

( * ) Notice: Subject to any disclaimer, the term of this patent is extended or adjusted under 35 U.S.C. 154(b) by 2042 days.

(21) Appl. No.: 11/567,691

(22) Filed: Dec. 6, 2006

(51) Int. Cl.
*G06F 17/21* (2006.01)

(52) U.S. Cl.
CPC ........................................ *G06F 17/21* (2013.01)

(58) Field of Classification Search
USPC ........................................................ 715/200
See application file for complete search history.

(56) References Cited

U.S. PATENT DOCUMENTS

| | | |
|---|---|---|
| 4,849,898 A | 7/1989 | Adi |
| 5,060,155 A | 10/1991 | van Zuijlen |
| 5,099,425 A | 3/1992 | Yuji et al. |
| 5,128,865 A | 7/1992 | Sadler |
| 5,297,042 A | 3/1994 | Morita |
| 5,303,150 A | 4/1994 | Kameda |
| 5,321,833 A | 6/1994 | Chang et al. |
| 5,323,310 A | 6/1994 | Robinson |
| 5,687,364 A | 11/1997 | Saund et al. |
| 5,832,494 A | 11/1998 | Egger et al. |
| 5,905,981 A | 5/1999 | Lawler |
| 5,920,854 A | 7/1999 | Kirsch et al. |
| 5,933,827 A | 8/1999 | Cole et al. |
| 6,088,692 A | 7/2000 | Driscoll |
| 6,173,298 B1 | 1/2001 | Smadja |
| 6,175,830 B1 | 1/2001 | Maynard |
| 6,256,623 B1 | 7/2001 | Jones |
| 6,462,758 B1 | 10/2002 | Price et al. |
| 6,647,410 B1 | 11/2003 | Scimone et al. |
| 6,697,793 B2 | 2/2004 | McGreevy |
| 6,701,307 B2 | 3/2004 | Himmelstein et al. |
| 6,714,933 B2 | 3/2004 | Musgrove et al. |
| 6,721,728 B2 | 4/2004 | McGreevy |
| 6,741,981 B2 | 5/2004 | McGreevy |
| 6,757,740 B1 | 6/2004 | Parekh et al. |
| 6,772,170 B2 | 8/2004 | Pennock et al. |
| 6,823,333 B2 | 11/2004 | McGreevy |
| 6,904,449 B1 | 6/2005 | Quinones |
| 6,938,046 B2 | 8/2005 | Cooke et al. |
| 7,031,970 B2 * | 4/2006 | Blitzer |
| 7,072,963 B2 | 7/2006 | Anderson et al. |
| 7,092,966 B2 | 8/2006 | Mcintyre |
| 7,162,053 B2 | 1/2007 | Camara et al. |
| 7,231,405 B2 | 6/2007 | Xia |
| 7,376,653 B2 | 5/2008 | Hart, III |
| 7,383,499 B2 * | 6/2008 | Kraft et al. ..................... 715/246 |
| 7,398,324 B2 | 7/2008 | Brennan et al. |

(Continued)

OTHER PUBLICATIONS

BBC News, "Google opens up 200 years of news", http://news.bbc.co.uk/go/pr/fr/-/2/hi/business/5317942.stm, 2 pages, (Sep. 6, 2006).

(Continued)

*Primary Examiner* — Kavita Padmanabhan
*Assistant Examiner* — Tionna Burke
(74) *Attorney, Agent, or Firm* — Mahamedi IP Law LLP

(57) ABSTRACT

Embodiments described herein provide a method for identifying at least one quotation from a text content source and selecting at least one of the identified quotations for prominent display on a presentation. In one embodiment, the presentation that displays the selected quotation is a webpage viewable over the Internet.

23 Claims, 6 Drawing Sheets

(56) References Cited

U.S. PATENT DOCUMENTS

| | | | |
|---|---|---|---|
| 2001/0003828 | A1 | 6/2001 | Peterson et al. |
| 2001/0025277 | A1 | 9/2001 | Hyldahl |
| 2002/0026349 | A1 | 2/2002 | Reilly et al. |
| 2002/0049727 | A1 | 4/2002 | Rothkopf |
| 2002/0078035 | A1 | 6/2002 | Frank et al. |
| 2002/0087599 | A1 | 7/2002 | Grant et al. |
| 2002/0089533 | A1* | 7/2002 | Hollaar et al. ............... 345/738 |
| 2002/0091671 | A1 | 7/2002 | Prokoph |
| 2002/0099700 | A1 | 7/2002 | Li |
| 2002/0116495 | A1 | 8/2002 | Hutten |
| 2002/0138331 | A1 | 9/2002 | Hosea et al. |
| 2002/0152245 | A1 | 10/2002 | McCaskey et al. |
| 2003/0046311 | A1 | 3/2003 | Baidya et al. |
| 2003/0065643 | A1 | 4/2003 | Musgrove et al. |
| 2003/0135490 | A1 | 7/2003 | Barrett et al. |
| 2004/0193691 | A1 | 9/2004 | Chang |
| 2004/0205677 | A1* | 10/2004 | Hughes et al. ............... 715/542 |
| 2005/0102628 | A1 | 5/2005 | Salesin et al. |
| 2005/0203970 | A1* | 9/2005 | McKeown et al. ............ 707/203 |
| 2006/0123329 | A1* | 6/2006 | Steen et al. .................. 715/500 |
| 2006/0248440 | A1* | 11/2006 | Rhoads et al. ............... 715/500 |
| 2007/0073777 | A1 | 3/2007 | Werwath et al. |

OTHER PUBLICATIONS

Brooks, Rodney A., "Intelligence Without Reason", MIT Artificial Intelligence Laboratory, A.I. Memo No. 1293, 1-27 (1991).

Brooks, Rodney A., "Intelligence without representation", Artificial Intelligence 47, 139-159 (1991).

Brooks, Rodney A., "Elephants Don't Play Chess", Robotics and Autonomous Systems 6, 3-15 (1990).

Final Office Action dated May 11. 2010 in U.S. Appl. No. 10/888,787, 50 pages.

Final Office Action dated Jul. 31, 2009 in U.S. Appl. No. 11/299,712, 20 pages.

Final Office Action dated Jun. 11, 2008 in U.S. Appl. 11/299,712, 20 pages.

Forbes.com, Reuters, "Key dates in the history of Google", http://www.forbes.com/business/businesstech/newswire/2004/04/29/rtr/353500.html, 3 pages, (Apr. 29, 2004).

Google Book Search: News & Views, "History of Google Book Search", http://books.google.com/googlebooks/newsviews/history.html, 3 pages (2006).

Google News from Wikipedia, http://en.wikipedia.org/wiki/Google_News, 3 pages, (2006).

Harnad, Stevan, "The Symbol Grounding Problem", Physica D 42: 335-346 (1990).

Information Mining with IBM Intelligent Miner Family, Daniel S. Tkach, IBM, Feb. 1998, 30 pages.

Juskalian, Russ L., "Google's evolution makes a great story", http://www.usatoday.com/tech/products/books/2005-09-11-google-book_x.htm, 3 pages, (Sep. 11, 2005).

Kevin S. McCurley, "Geospatial Mapping and Navigation of the Web," WWW10, May 1-5, 2001, ACM 1-58113-348-0/01/0005, 9 pages.

Labrou, et al., "Yahoo! as an Ontology—Using Yahoo! Categories to Describe Documents", Conference on Information and Knowledge Management, Kansas City, 1999, 8 pages.

Non-Final Office Action dated Sep. 17, 2008 in U.S. Appl. No. 10/888,787, 29 pages.

Non-Final Office Action dated Dec. 30, 2009 in U.S. Appl. No. 11/864,882, 13 pages.

Non-Final Office Action dated Jun. 25, 2009 in U.S. Appl. No. 10/888,787, 40 pages.

Non-Final Office Action dated Dec. 12, 2007 in U.S. Appl. No. 11/299,712, 13 pages.

Non-Final Office Action dated Dec. 16, 2008 in U.S. Appl. No. 11/299,712, 19 pages.

Non-Final Office Action dated Dec. 23, 2009 in U.S. Appl. No. 11/299,712, 22 pages.

Price, Gary, "Bye Bye Beta: Google News is a Beta No More", http://blog.searchenginewatch.com/blog/060123-142418, 4 pages, posted Jan. 23, 2006.

Schilit, et al., "Challenge: Ubiquitous Location-Aware Computing and the "Place Lab" Initiative," WMASH'03, Sep. 19, 2003, ACM 1-58113-768-0/03/0009, 7 pages.

Searle, John R., "Minds, Brains, and Programs", unedited draft, Behavioral and Brain Sciences 3 (3): 417-457 (1980).

Shafer, Jack, "The new Google News site, news untouched by human hands", Slate Press Box Automated News, http://www.slate.com/id/2071499/, 2 pages, posted Sep. 24, 2002.

Sweney, Mark and Wray, Richard, "Google News archive opens window on history", http://business.guardian.co.uk/story10,,1866295,00.html, 1 page, (Sep. 7, 2006).

* cited by examiner

SYSTEM AND METHOD FOR DISPLAYING QUOTATIONS

TECHNICAL FIELD

The disclosed embodiments relate generally to the field of text analysis, and more particularly, to a system and method for displaying quotations from text content in prominence.

BACKGROUND

Printed material, whether it be in magazines, newspapers, or books often contain quotations regarding the subject matter of the material. Often times, a quotation cited in a news or magazine article succinctly and concisely summarizes the content, theme, or topic of the article. This may peak a reader's interest or give the reader a more thorough understanding of the content of the article than the reader would have obtained by simply reading the title. Often times in printed text, a quotation may be placed somewhere on the page so it stands out, drawing the attention of the reader to the quotation.

As use of the Internet becomes more widespread, more and more information and news is being disseminated by online news agencies. As this information is accessed online and downloaded on a webpage, the quotations in the article may not be readily viewable to an individual. This may occur for a number of reasons. For example, the webpage containing the text may not have sufficient room to display the quotation, or a quotation may not have been selected for display.

DETAILED DESCRIPTION

Figure 1:
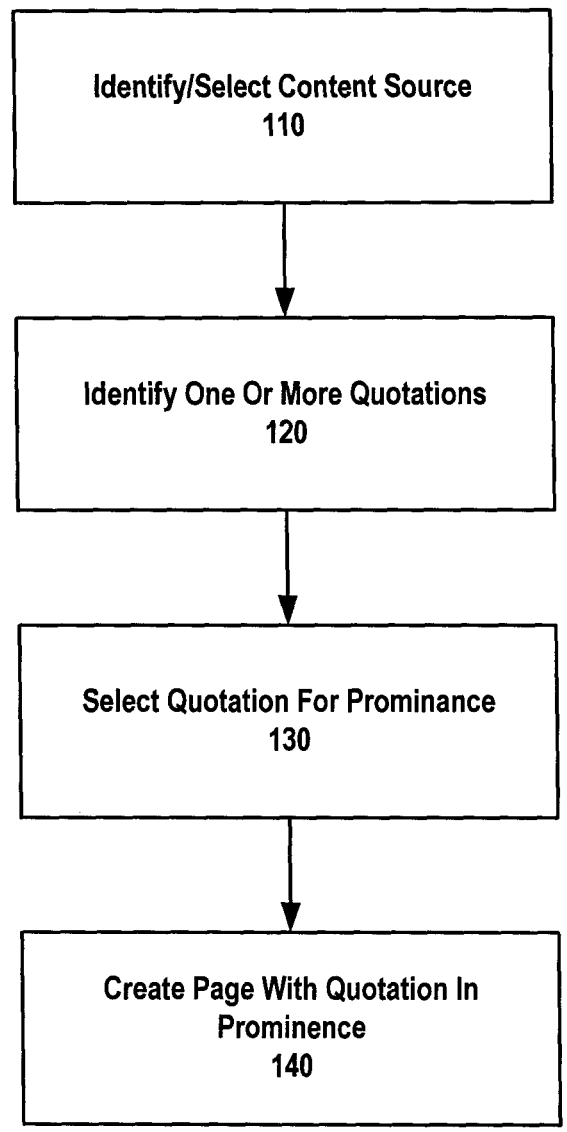
FIG. 1 describes a technique for using quotations contained in a text of a content item, under an embodiment of the invention.

Embodiments described herein provide for a programmatic mechanism by which text in content from any one of numerous sources is scanned or analyzed to detect quotations. When presentations (e.g. webpages) are created based on the content, one or more quotations are displayed in prominence. The effect of the quotations is that the presentation is enhanced and made more interesting to the user, as the quotation provides the user with a point of interest that is visually identifiable.

According to an embodiment, one or more quotations are identified from a text of a content item. A presentation is then created based at least in part on the text of the content item. At least a portion of one of the identified quotations is placed in prominence with the presentation.

As used herein, a "content item" includes a file that has content, such as a web page or other form of a document.

The term "prominence" means visually distinct or otherwise identifiable from other text and/or content.

Furthermore, as used herein, the term quotation means a passage of text that is attributed to a particular source, such as the spoken or written words of a person. In text, a quotation is usually designated by the use quotation marks.

The term "text content" includes any electronic media on which text, in the form of characters or words, can be identified. Text content may include text data, such as ASCII data. Under one or more embodiments, text data may also include images that contain text (e.g. JPEG) from which text can be recognized.

One or more embodiments contemplate that one or more quotations may be contained in a text content source. The text content source may be from a document stored locally on a personal computer or other storage device. Alternatively, the text content may be stored remotely on a server and accessed over the Internet. Text content may also come from a document that has been scanned for storage or transmission.

Under one embodiment, text is identified by an individual wishing to view a particular source or article on an online news source or other online medium. Selection of a particular article is akin to identifying the text content source. Upon selection, the article is "read and understood" by the system. The system selects one or more quotations to display in prominence on the page based on the understanding it obtains from "reading" the article. For example, the program may scan the identified text for quotations. While scanning, the program gains an understanding of subject matter of the article. One or more quotations that relates to or conveys the gist of the article or text may then be selected. Quotations in the article may be "copied" from the article and "pasted" in a prominent place on the webpage when the article is displayed to an individual. According to an embodiment, any identified quotation may be selected for prominent display. The quotation selected may be the first quotation in the article, the last quotation in the article, or any other quotation in the text.

Other embodiments contemplate that a picture may be placed in proximity to the selected quotation(s). In such cases, the picture relates to the subject matter of the quotation. For example, the selected picture may be of the person making the quotation. The picture may be of the person about whom the quotation is made. In some cases there may be multiple quotations and pictures selected and displayed.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, one or more embodiments described herein may be implemented through the use of instructions that are executable by one or more processors. These instructions may be carried on a computer-readable medium. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 describes a technique for using quotations contained in a text of a content item, under an embodiment of the invention. A method such as described with FIG. 1 may be implemented using a system such as described in FIG. 3.

In step 110, a content item is selected or identified for use. According to an embodiment, the content item is in the form of a document or other item that can be retrieved or parsed for text content. In one embodiment, the content item is an online document, such as provided by websites that carry news stories, blogs, journals, messages or other forms of text content. In one implementation, the content item may be in the form of an HTML page, or alternatively an RSS Feed, although numerous other types of online documents and content resources can also be used. Additionally, one or more embodiments provide that a remote source that carries text content may be accessed by programmatic retrieval components (e.g. web crawlers), so that a technique and method such as described by embodiments herein is performed on numerous content items concurrently.

Step 120 provides that one or more quotations are identified from the text of the content item(s) that are identified in step 110. According to an embodiment, the text of the content item is parsed or scanned for particular markers (e.g. punctuation marks) that set apart or otherwise distinguish a quotation from other portions of text. Under an embodiment, the text content may be parsed or scanned for markers that are known to designate the presence of a quotation. Examples of such markers include: (i) "(double quotation marker), or (ii) ' (single quotation marker). Other markers may be used, including for example, text appearing in an indented paragraph (in which case indentations may be the markers), text content having spacing (e.g. single space) that is different from other portions of the text, or formatting (e.g. bold and/or italic) that is different from the remainder of the text. In one embodiment, the programmatic determination as to the presence of a quotation with visual markers may be made without any advanced understanding of how the particular content item may use the quotation. For example, a program may scan the text of a content item for quotation marks ("or').

Other embodiments provide that the programmatic component implements intelligence or knowledge to determine how a particular content item may signify quotations. For example, in legal briefs, the programmatic component may realize quotations can appear in heavily indented paragraphs. Other embodiments may train a programmatic component to identify specific visual markers for how quotations appear at a particular source of the content item. In step 120, the text content may be "read" and "understood" by a program, enabling an intelligent programmatic decision of quotation selection.

In step 130, a quotation is selected for prominence when displaying content using text from the content item of step 120. According to an embodiment, numerous quotations are identified from a given content item, and one quotation may be selected based on rules or a scheme for prioritizing or giving preference to a particular quotation. More than one quotation may also be selected for prominence in the content displayed. As will be described in more detail below, the selection of the quotation may be based in part on the selected quotation's conformance to a set of defined quotation rules. Such rules may include, for example, (i) the minimum and/or maximum amount of characters a quotation may have to be eligible for display on a page, and (ii) relative placement of the quotation in the overall content. If there are multiple quotations that satisfy quotation rules, other rules, criteria or factors may be used to enable a programmatic decision to be made as to which quotation will be selected for display.

Some identified quotations may also be disqualified as not being true statements of others, but rather titles of literary or dramatic works. The defined quotation rules may include criteria to distinguish quotations that are statements from phrases that are titles of works. In one embodiment, a quotation rule may include a requirement that a phrase that is to be considered a candidate quotation for prominence must not include capitalization in a percentage of words that follow the first word. For example, the rule may exclude use of phrases between quotation markers that have at least 50% (or some other percentage) of words in which least a first letter is capitalized. As an illustration, the appearance of the phrase "Its gone with the wind" may be deemed to be a valid quotation, while the phrase "Gone With The Wind" may be deemed a title of a literary work. This determination may be made because of with the literary work, each word provided with the quotation markers is capitalized.

In one embodiment, the decision of which quotation to display may be based in part on secondary criteria. Secondary criteria may specify how well the quotation summarizes the subject matter of the article or text, or how closely the quotation relates to the title of the article or text. Intelligent and/or programmatic techniques for understanding the subject matter or relevance of a text content may be implemented. Such techniques may determine the subject or relevant topics of a text content item by performing, for example, one or more of: (i) identifying key words, (ii) analyzing placement of key words, such as in headlines or at the beginning of a text item, (iii) identifying commonality of specific words, such as key words, and (iv) factoring a source of the content item. All these factors can be used to determine a subject of the content item, or a relevance of that content item. From this determination, one or more embodiments may select a quotation for prominence.

In addition to using rules to select quotations, one or more embodiments provide for using such rules to make non-conforming quotations conform to a particular format, sizing or other requirement. For example, a quotation that is too long may be abbreviated, based on available spacing when making the quotation prominently displayed.

In step 140, content is displayed based on the content item, and the identified or selected quotation is provided in prominence with the displayed content. In one embodiment, the displayed content is in the form of a webpage, or other paginated document, and, a quotation appearing in the original content item is displayed in prominence on that page. The content may be displayed in the form of a summary, compilation, and/or copy of the text content of the original content item. In one embodiment, the selected or identified quotation is copied, enlarged and/or formatted distinctly, and placed outside of the body of a text that is from the original content item (e.g. summary paragraph or entire text of an article). The quotation may also be placed adjacent to a picture. An example of such an implementation is shown with an embodiment of FIG. 4 or FIG. 5.

In an embodiment, the displayed content is provided in a webpage that contains both the quotation displayed in prominence and the text the quotation was taken from. Under one implementation, the webpage includes news from an online news source. According to one implementation, a quotation may be identified from the news article and re-displayed on a web page adjacent to the article with an alternative formatting or size.

Examples of how a quotation may be placed in prominence include one or more of the following: (i) placing the quotation in either the left hand or right hand margins of a document; (ii) formatting the quotation with font or font graphics (e.g. bold, italicize, or coloring), (iii) sizing the quotation (e.g. making it larger) to be a different size from other text content on the same webpage or document, and (iv) including visual markers where a selected or identified quotation is located to make the presence of the quotation more easily identifiable. For example, in order to set the quotation apart from the rest of the text, the selected quotation may be in Arial font type, grey type face, with a font size of 16, while the original text of the article may be in Times New Roman font, black type face, with a font size of 12.

Under one embodiment, a selected quotation may be displayed adjacent to a picture that is either included with the original content item, or selected for the content being displayed. In one embodiment, the picture is selected for the content item based on identification of a category or subject of the content item. Such an embodiment is described in more detail with U.S. patent application Ser. No. 11/299,712 which is incorporated herein by reference. The picture may correspond to a stock photograph or other image contained in a library for use in displaying, for example, summaries of news stories. As an alternative or additional implementation, a selected picture may be programmatically or manually selected to identify a person or entity who spoke or is the subject of the selected quotation. As an example, the selected quotation may be programmatically or manually identified as having been spoken by the President of the United States. As the page is created, a stock photo of the President is selected and displayed near the selected quotation.

Methodology

Figure 2A:
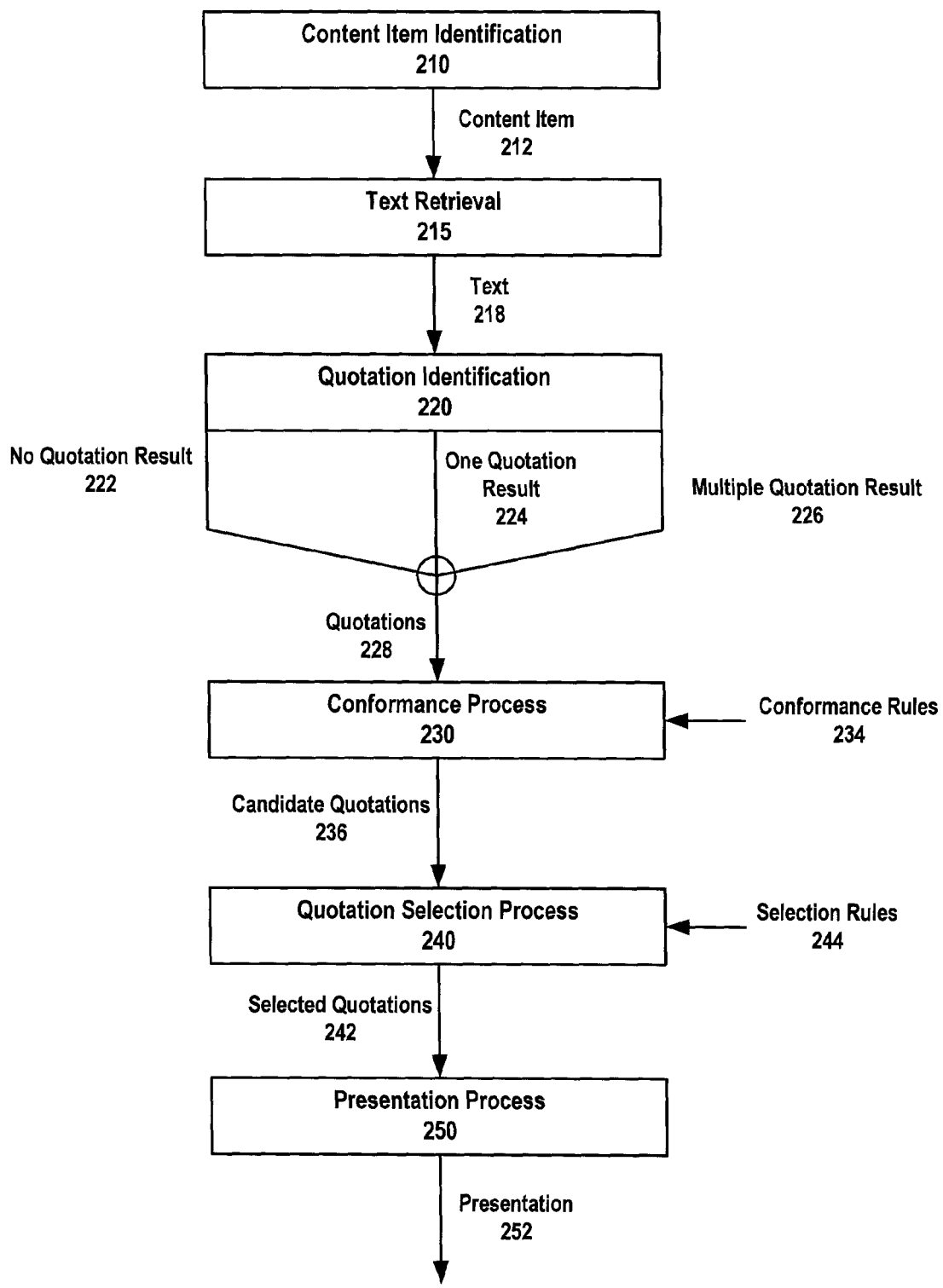
FIG. 2A illustrates a process for identifying and displaying text content in prominence on a page, under an embodiment of the invention.

FIG. 2A illustrates a process for identifying and displaying text content in prominence on a page, under an embodiment of the invention. A process such as described with FIG. 2A may be used in the context of a system that aggregates content from various content items, and displays such content in a reformatted presentation. An embodiment of FIG. 2A may be implemented in a system that aggregates and updates a website ("content aggregation site") where content from numerous online sources are displayed and updated on a continuous basis. According to one or more embodiments, a process such as described with FIG. 2A may be provided with a content aggregation site that displays (i) summaries or paraphrases of content items from other sites with links to the source content items, (ii) re-presented content copied or derived from the source content items, and/or (iii) images, media and other content selected for display with summary or re-presented content. Other content, such as advertisements and other features may be combined with the content aggregation site.

As a result of embodiments described herein, quotations may be generated and used to enhance the presentation of any one of the following: (i) a webpage (e.g. home page) where summary or re-presented content from various content items are displayed; (ii) a webpage where content derived from the content item is displayed, with or without enhancements such as selected images (e.g. story page).

A content item identification process 210 may initially locate one or more content items 212 from various sources. The content items 212 may correspond to documents (e.g. webpage) that are located at various network locations. In a given time period, process 210 may be performed to identify content items from numerous network locations, such as websites where news and/or blogs are posted. The content items 212 may correspond to, for example, an online article (e.g. from a magazine or news website), a blog entry or page, a message from a message board, or even an email from an email account.

In an online medium, content items 212 typically include a mixture of different forms of content, as well as other data elements. For example, a news story from an online site may include advertisements, links to other articles or web searches, and images that relate to the story. A text retrieval process 215 provides that the text 218 from individual content items are identified and retrieved for analysis. In one embodiment, the selected text 218 may be identified as being a basis for content that can be provided on the content aggregation site. For example, the retrieved text 218 may be distinguished from text that accompanies advertisements or captions of images.

A quotation identification process 220 identifies quotations 228 that may be present in the text 218 of one or more content items 212. In one embodiment, the quotation identification process 220 programmatically analyzes the text 218 to identify quotations (if any) that are present in a given content item 212. In an embodiment, the text in the document may be scanned or parsed to identify markers of quotations. A quotation marker may correspond to any detectable indication that a given string of words are a quotation. According to one or more embodiments, the markers may correspond be quotation marks (whether single or double), or any other indication of quotations, such as indentations, italics, or paragraph breaks that set apart or delineate quotations from other portions of text. In analyzing text to identify quotations, an embodiment such as described by FIG. 2B may be implemented to identify and extract quotations from the text of a content item.

Additionally, one or more embodiments provide that the analysis of the text from the content item may be accompanied by one or more processes (not shown) to categorize the content by subject, or to identify a subject or relevant topic of the text. For example, key words, placement of key words, commonality of words and phrases, and the source of the content item may factor into programmatically determining a topic or category for the text of the content item. Still further, the topic or category may be determined through one or more manual processes.

The quotation identification process 220 may have different results. The analysis of the text 218 by process 220 may provide a no quotations result 222, where no quotations are found in text 218. In another instance, the performance of process 220 provides a single quotations result 224, meaning text 218 was analyzed and only one quotation was determined as being present. Still further, performance of process 220 on any single content item 212 may result in multiple quotations 226 being identified.

For identified quotations 228 of results 224, 226, a conformance process 230 may be performed to determine whether individual quotations of results 224, 226 are in conformance with criteria that determines whether the quotation is a candidate to be displayed in prominence. A set of rules 234 may be implemented to define such criteria. Under one implementation, such rules 234 may correspond to using quotations of a specific size (e.g. between 50 and 250 words in size) for prominence. Examples of other rules 234 that may comprise some or all of the criteria include a rule based on a determination or understanding as to whether the quotation summarizes or explains the subject matter of the document, and/or a rule that requires the quotation to conform to a space provided on the webpage for where the quotation is to be displayed with prominence. Still further, another rule may discard any identified phrase provided with quotation markers that includes capitalization of a percentage of words contained in the phrase. Such a rule would distinguish literary and dramatic work titles from true quotations. For example, a rule may provide that if 50% of the words in a phrase contained between quotation markers is capitalized, the phrase is to be discarded for consideration. Such a rule would assume the heavy capitalization of words in the phrase or indicative of the phrase being a title of a movie, novel, poem or other work.

According to one or more embodiments, conformance rules 234 may be used for different context. For example, the source of content item 212 may determine the rules that designate what quotations are candidates for prominence.

In one embodiment, any quotations that do not satisfy criteria set by rules 234 may be ignored or discarded from the process. According to another embodiment, if a given quotation does not satisfy the criteria designated by the rules, the quotation may be edited to be compliant. For example, if one of the rules 234 state a proper length for a quotation, performance of the conformance process 230 may result in the quotation being edited to a proper size, rather than discarded. The result of the conformance process 230 is that candidate quotations 236 (if any) are identified.

The conformance process 230 and selection process 240 may be separately formed for text 218 from individual content items 212. Thus, if the quotation identification process 220 results in a no quotations result 222, conformance and selection processes 230, 240 may be bypassed. Alternatively, the processes of an embodiment of FIG. 2 may be performed concurrently for various content items 212.

An embodiment such as described with FIG. 2A contemplates that a presentation 252 is created by a presentation process 250 that displays content corresponding to the text 218 and/or content items 212. As mentioned, for example, the presentation 252 may correspond to (i) a webpage where summaries or re-presented content is displayed from content items 212, or (ii) a webpage where content corresponds to just one content item 212 or its text 218. In either scenario, one or more embodiments contemplate enhancing the presentation with the display of quotations in prominence. For example, one or two quotations may be selected for a webpage that contains numerous articles (or links to such articles). Or more simply, a single page for one article may have one quotation displayed in prominence from that same article.

One or more embodiments provide that a quotation selection process 240 is performed in order to select quotations 242 for use in the presentation process 250. Selection process 240 may be applied when multiple quotations 236 are identified for a given presentation 252, and a selection of those quotations has to be made to identify selected quotations 242. Selection process 240 may apply selection rules 244 that factor, weigh or otherwise use, for example, quotation size, quotation position in its source content item, the identified subject matter (e.g. key word identification) of the quotations, the person whom the quotation is attributed to, and the nature of the presentation 252 (i.e. is it a general page or specific to one story or topic). The rules 244 may provide for use of numerous other factors such as the space available for the prominent display of the quotation on the presentation 252. In one embodiment, an intelligent programmatic decision is made to select the candidate quotation(s) 236 which best summarize or relates to the overall theme of the presentation 252 that is to be created or updated.

According to an embodiment, presentation process 250 prominently displays selected quotations 242 by placing the selected quotations 242 in a place on the presentation 252 where it can be easily seen and read. For example, the presentation 252 may provide a webpage in the form of an online newspaper, and the selected quotation 242 may appear in the margin, with or without larger sizing, alternative coloring and/or formatting. The selected quotations 242 may also be formatted differently from the rest of the text so a reader's eye is drawn to the quotation. For example, the font of the quotation may be a different color, size, and/or typeface (bold, italic, underlined or any such combination) than the rest of the text. As part of the presentation process 250, images (e.g. stock photographs) may be selected for display on the presentation 252, in connection with a selected quotation 242. For example, a selected quotation 242 may be provided just above or below a selected image.

Figure 2B:
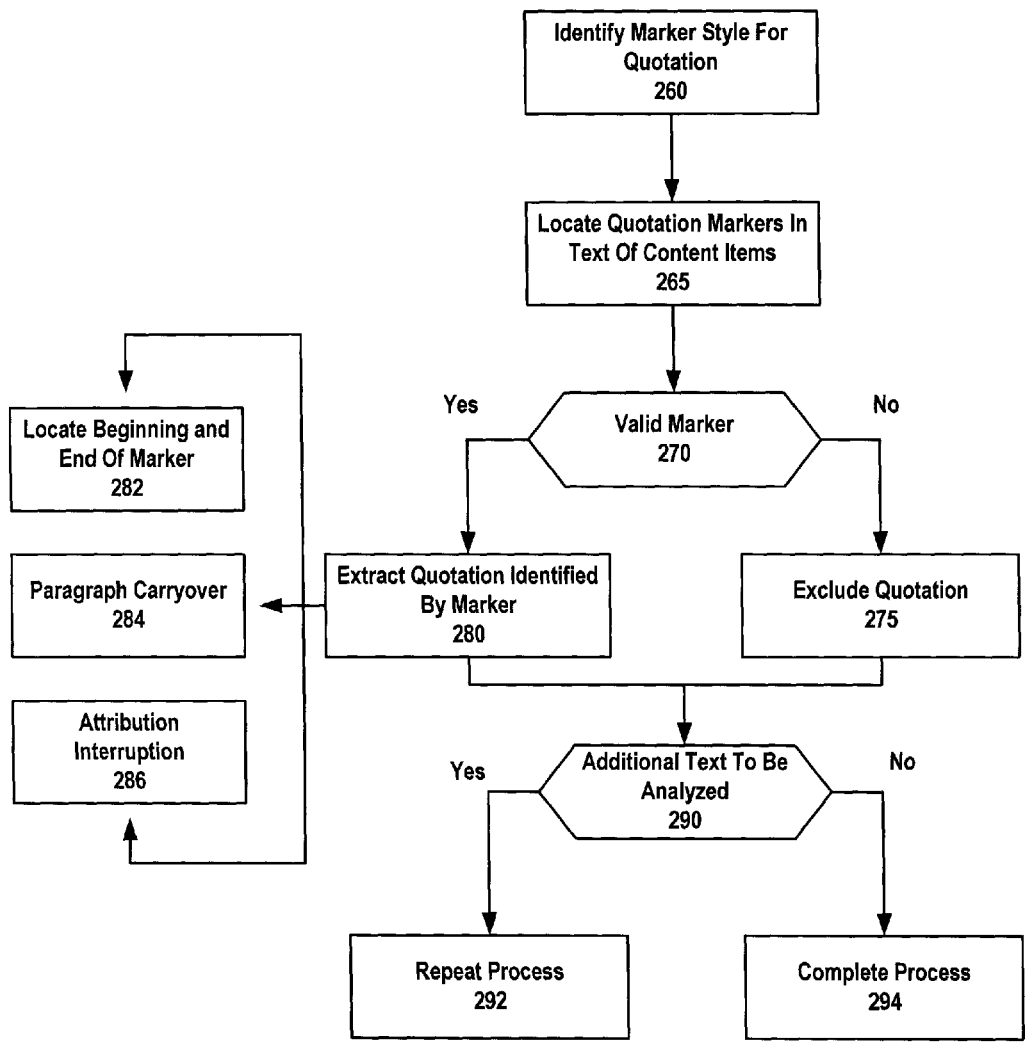
FIG. 2B illustrates a technique for identifying a quotation from a given content item, under an embodiment.

FIG. 2B illustrates a technique for identifying a quotation from a given content item, under an embodiment. A method such as described with FIG. 2B may be performed by, or in connection with, for example, a quotation identification process 220 as shown in FIG. 2A. Reference may be made to elements described with FIG. 2A for purpose of illustration.

In a step 260, the manner in which a particular content item 212 indicates quotations is determined or assumed. Different conventions may, for example, have different quotation markers (e.g. single versus double quotation marker). In one embodiment, a particular quotation marker style is assumed, unless another marker style is detected from the content item 212.

In one embodiment, the quotation identification process 220 uses the first quotation marker style encountered from a given content item 212 to determine subsequent quotations. For example, the process 220 may encounter a double quotation marker symbol, followed by text that the process determines to be quotation content. Upon encountering the double quotation marker symbol, the process 220 will seek only double quotation markers to identify other quotations that may be in the same content item. Such an assumption assumes that the content item 212 does not switch conventions when marking quotations. Such an assumption enables the process 220 to more readily discard markers that would otherwise be considered quotation markers, such as a single apostrophe (') marker which can denote a contraction (e.g. can't), but the process may be flexible to quotation marker symbols based on the first convention encountered (e.g. single quotation marker symbol).

Still further, another embodiment may assume a quotation marker style based on prior knowledge about the content item 212. For example, if the content item 212 is from a particular source or country, process 220 may be configured to assume a particular kind of quotation marker style.

Step 265 provides that the quotation markers are determined for a given content item 212. Step 265 may be combined with step 260, or performed instead of step 260. For example, the first quotation marker may be used to determine the style of quotation markers for the remainder of the document. As an example, identification of quotation markers may involve locating all quotation markers of a particular style (e.g. double quotation mark) in the text 218 of a given content item 212. As another example, identification of quotation markers may involve locating quotation markers for more than one style (single quotation marks, brackets, double quotation marks).

In step 270, a determination is made as to whether an identified quotation marker from step 265 is valid. Certain quotation markers of a particular style may have alternative uses. For example, single quotation markers may denote both the beginning and end of a quotation, as well as the alternative use of a contraction of a word. In order to determine whether a single quotation marker (') is not a contraction, a programmatic process may identify one or more of the following: (i) whether the identified quotation marker is followed by a capital letter, in which case it can be assumed to be a begin quotation marker; (ii) whether the identified quotation marker is preceded by a comma or period, which favors a determination that the quotation marker indicates an end quotation; (iii) whether the identified quotation marker is preceded by a character, in which case the assumption favors the conclusion that the single quotation marker is a contraction symbol. Other decisions may be provided for other styles of quotation markers.

If the determination of step 270 is that the quotation marker is not valid, then step 275 provides that the quotation marker is ignored. In step 290 a determinations is made as to whether additional text in the content item 212 remains to be analyzed to identify quotations. If so, step 292 provides that the method may be repeated (perhaps with the assumption that the quotation marker style is known). Otherwise, step 294 provides that the process is complete for a given content item 212.

If the determination of step 270 is that the quotation marker is valid, then step 280 provides that the quotation identified by the marker is extracted. This may involve multiple sub-steps. Sub-step 282 provides that the end or paired quotation marker is located, and all text between the beginning and end quotation is identified as a quotation. Sub-steps 284 and 286 describe special cases where extraction of quotation may be more involved than simply identifying a paired end quotation.

In step 284, the paired or end quotation is part of a paragraph carry over. The sub-step 284 may accommodate a paragraph separation character in the text data 218, between a pair of quotation markers, indicating the presence of the paragraph in the content item. In one embodiment, the paragraph separation (which may be indicated by a character or code) between adjacent or paired quotation markers is ignored, and text appearing between the quotation markers is extracted as being part of a quotation.

In step 286, the quotation may contain an attribution. For example, a single quotation may be divided into two parts separated by the name of the person making the statement (e.g. "I can't believe we didn't win the game after mounting such a tremendous comeback." Bill said, "What a disappointment."). In this case, the attribution will be removed and both parts of the quotation (e.g. the part of the quotation before the attribution and the part quotation after the attribution) may be extracted and selected for display.

System Architecture

Figure 3:
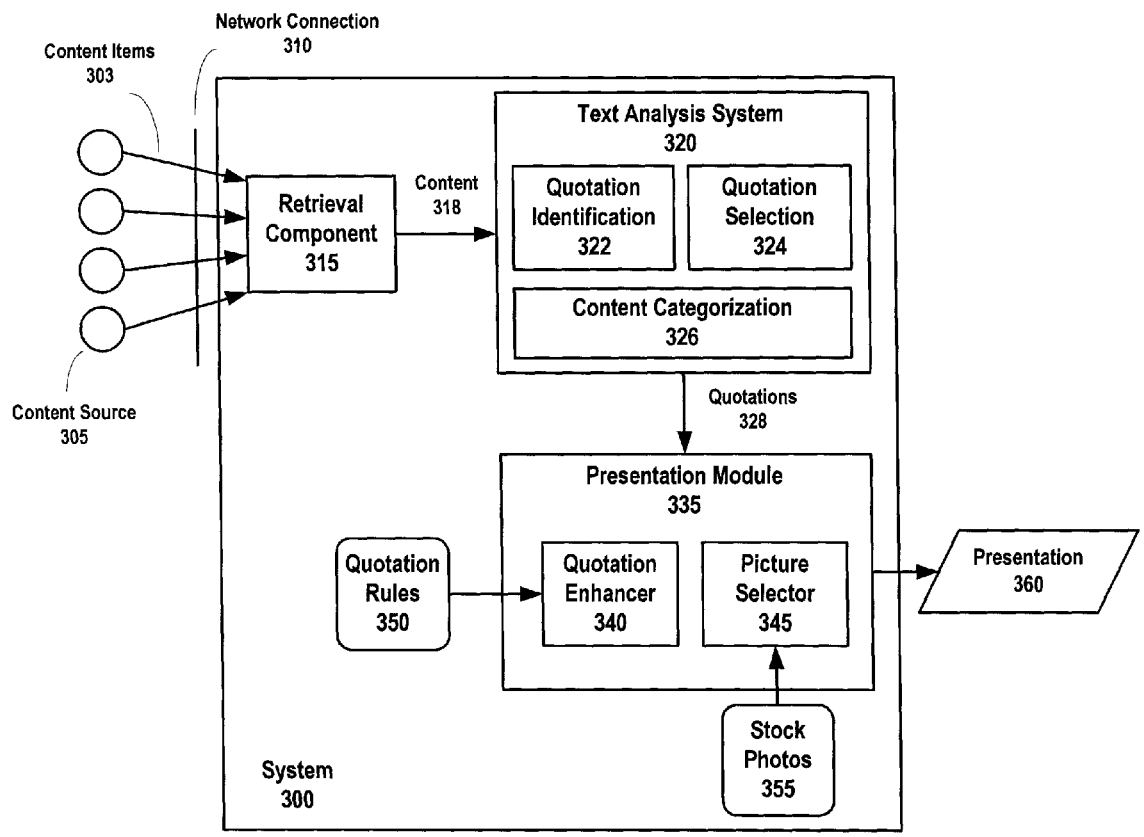
FIG. 3 illustrates a system for creating presentations that include text content with programmatically identified and selected quotations placed in prominence, according to an embodiment of the invention.

FIG. 3 illustrates a system for creating presentations that include text content with programmatically identified and selected quotations placed in prominence, according to an embodiment of the invention. In an embodiment, system 300 retrieves content, including text, from content items (e.g. web pages, documents) distributed across various locations of the Internet and/or other networks. System 300 also creates presentations that summarize and/or re-present content retrieved from the content items, with selected quotations displayed in prominence. In an embodiment, system 300 includes a retrieval component 315, a text analysis system 320, and a presentation module 335. Presentation module 335 may contain a quotation enhancer 340 for configuring the how the selected quotation will be formatted and displayed. The presentation module 335 may also include other components to create and enhance presentations, including picture component 345.

In an embodiment, the retrieval component 315 locates and retrieves content items 303 from various websites, domains, and other network locations (collectively "content sources 305"). The content sources 305 may be accessible by Uniform Resource Locators (URLs), across one or more networks 310 such as the Internet. Retrieval component 315 may perform the content item identification process 210, as described with an embodiment of FIG. 2. As such, retrieval component 315 may parse and extract content 318, including text content, from individual content items 303. To this end, one or more embodiments provide that the retrieval component 315 includes intelligence or knowledge to identify how to parse content items 303 for text and other content 318.

According to an embodiment, content retrieval component 315 communicates the content 318 to the text analysis system 320. Text analysis system 320 may include several processes and/or components to perform different analysis on the content 318. According to one or more embodiments, the text analysis system 320 includes a quotation identification component 322, a quotation selection component 324, and a content categorization component 326. In one embodiment, quotation identification component 322 performs a process such as described with quotation identification process 220 of an embodiment of FIG. 2A. In an embodiment, quotation identification component 322 scans the text of content 318 for quotation markers. As described with an embodiment of FIG. 2B, the identification of quotation markers may include determining a particular quotation marker style used by the content item to signify quotations. To this end, one or more embodiments provide that quotation identification component 322 scans the content 318, by parsing the characters in the content 318 of a particular content item 303 to search for defined markers, white space, paragraph breaks, line breaks, column breaks, and/or spaces or indentations that set quotations apart from other parts of the text. According to an embodiment, quotation identification component 322 is able to distinguish between different punctuation marks used in text. For example, quotation identification component 322 is able to distinguish a quotation in single quotation marks (' ') from a quotation in double quotation marks (" ") depending on the type of quotation marks used in the content 318. In addition, quotation identification component 322 may be configured to distinguish beginning quotation markers (whether in single or double quotation style).

As described with an embodiment of FIG. 2B, an embodiment provides that, in performing the quotation identification process 220 (FIG. 2A), the quotation identification component 322 is able to determine when quotation markers are valid indicators of quotations, as compared to incidental use of those same symbols for other purposes. In one embodiment, the quotation identification component 322 includes logic or processes to distinguish quotations in single quotation marks (' ') from contractions containing apostrophes ('). As an example, a quotation in content 318 may be designated as a quotation using single quotation marks to read as follows: 'I can't believe we didn't win the game after mounting such a tremendous comeback. What a disappointment.' The quotation identification component 322 distinguishes the quotation mark before the "I" from the apostrophes used in "can't" and "didn't" to find the end of the quotation that ends with the word "disappointment". In this way, the quotation identification component 322 ensures whole quote is identified for the selection process.

Under one embodiment, quotation identification component 322 may also include logic and processes to identify quotations separated by an attribution. For example, adding an attribution to the quotation above, a given quotation may read: 'I can't believe we didn't win the game after mounting such a tremendous comeback,' Bill said, 'What a disappointment.' Text analysis system 320 may identify the whole quotation and extract the attribution, "Bill said" leaving the rest of the quotation intact.

The quotation selection component 324 selects what quotation(s) to display in prominence for a given presentation. For example, a presentation may display summaries of various content items 303 from different sources 305, or a presentation may include a re-presentation of just one content item. In either case, quotation identification component 322 may identify multiple quotations from a given content item and quotation selection component 324 may select multiple quotations for display. In one embodiment, the quotation selection component 324 performs the conformance process 230 and/or the quotation selection process 240 of FIG. 2A to determine which identified quotations to include in prominence on the presentation.

Under an embodiment, quotation rules 350 govern or influence criteria by which selection of quotations are made for prominence on a given presentation. Embodiments of FIG. 2A illustrate use of various quotation rules to identify candidate quotations and to select quotations for prominence. Such rules 350 may, for example, specify quotation length and accommodate specific display spaces. Quotation rules 350 may also provide other rules of quotation selection and editing. For example, the rules may include whether the whole quotation will be displayed or whether a partial quotation may be displayed. Continuing with the example from above, the quotation may read: 'I can't believe we didn't win the game after mounting such a tremendous comeback. What a disappointment.' The part of the quotation stating "What a disappointment." may be dropped from the quotation. As a result, only the first sentence, "I can't believe we didn't win the game after mounting such a tremendous comeback", will be displayed on the page. Other edits to quotations may include whether a quotation may be abbreviated when displayed in prominence, or if ellipses may be added to the quotation. In yet another example, the quotation may be edited to add/remove italics or other typefaces occurring in the text based content 318, so the quotation may be displayed without the added emphasis. Further examples of when a quotation may be edited may be when a selected quotation needs to be corrected or explained by the use of square brackets to enclose explanatory or missing material. In such a case, the original quotation may read: 'I can't believe we didn't win it after mounting such a tremendous comeback. What a disappointment.' After subsequent edits, the quotation may read: 'I can't believe we didn't win [the game] after mounting such a tremendous comeback. What a disappointment.' Other examples of edits include instances where [sic] may be added to a quotation to indicate that an incorrect or unusual spelling is in the original text or an unusual or incorrect phraseology was used in the original quotation.

In another embodiment, the categorization component 326 of text analysis system 320 analyzes content 318 to categorize the content items 303 for presentation. For example, summaries or re-presentations of content 318 from a given content item 303 may be provided on one or more webpages that designate a category, topic, or subject. To this end, the categorization component may identify key words, locate the relative position of the keywords in the document, identify the commonality of the keywords, and gather information form the source 305 of the content item 303 from which content 318 was retrieved. The text analysis system 320 may include logic to utilize the categorization component 326, by relating a quotation identified from the content 318 of a given content item to the category or categories that are programmatically determined for the content 318. In one embodiment, the quotations are related to the determined category for purpose of enabling or enhancing the quotation selection component 324 to identify which of a plurality of candidate quotations are best for prominent display in the presentation that is formed from the content 318.

Text analysis system 320 communicates one or more identified and selected quotations 328 to presentation module 335. In an embodiment, presentation module 335 creates the presentations 360, which may include the selective display of quotations 328 in connection with content derived from content items 303. Among many processes presentation module 335 performs to create presentation 360, one or more embodiments provide that the presentation module renders a webpage containing both text and image content. One or both of the text and image content may be selected for the page based on various factors and parameters, including importance, appearance, quality etc. Each of these parameters may be accounted for as part of the rendering process.

In one implementation, the text content of the presentation 360 is a summary of the content from an underlying content item 303, and a link is provided to enable the person to access the underlying content item 303 (e.g. webpage). In another or additional implementation, the presentation 360 is a presentation of the content from the original content item 303. In either case, selected quotation 328 is provided in prominence with the presentation 360.

To enhance the presentation 360, presentation module 335 includes may include a quotation enhancer 340 and/or a picture selector 345. The quotation enhancer 340 may perform formatting, placement, sizing, coloring or other affects on selected quotations 328 to provide prominence to the selected quotations. The picture selected 345 may perform actions of selecting photographs or other media to include in the presentations 360.

In one embodiment, when at least one quotation has been selected by quotation selection component 324 and enhanced by quotation enhancer 340, picture selector 345 may select a picture from a collection of stock photos 355. Other libraries of media (e.g. advertisement media) may also be used or provided processes with the presentation module 335 for selection and inclusion in the presentation 360. As with the intelligent selection of the quotation, one or more embodiments provide that an intelligent selection of a stock photo 355 may be made by picture selector 345. For example, a picture may be selected based on a category assigned by the categorization component 326 to the content item 303, as compared to a text caption or metadata provided in association with the content item 303. The presentation module 335 may provide a selected picture from the stock photos 355 placed in proximity or adjacent to one of the selected quotation 328 for the given presentation 360.

In one embodiment, picture selector 345 may select a picture from stock photos 355 based on (i) who stated the selected quotation, (ii) who the quotation is about, (iii) a particular event the quotation relates to (e.g. holiday, sporting event), or (iv) a landmark or geographic region the quote pertains to (e.g. Grand Canyon, White House). For example, if the selected quotation 328 is attributed to the President of the United States, picture selector 345 may select a stock photo of the President from stock photos 355. Alternatively, if the selected quotation is attributed to a third party and is about the President of the United States, picture selector 345 may select a stock photo of the President or a stock photo of the third party to whom the quotation is attributed. In another example, a quotation may be made by the President of the United States concerning conserving national treasures or landmarks (e.g. the Grand Canyon). In such a case, a stock photo of the President or a stock photo of the Grand Canyon may be selected by picture selector 345.

Once quotations 328 have been selected for the presentation 360, the presentation module 335 formats the layout of the page 360 that will be presented. In one implementation, presentation module 335 formats the page so the original text content from content item 303 is displayed on the completed page 360 along with the selected quotation and optional picture. In another implementation, the quotation enhancer 340 of the presentation module 335 may format the selected quotation based on available space on the page. The quotation enhancer 340 may also select a font type, color, or size for the quotation so the quotation may stand out from the text content of the rest of the page 360. The quotation enhancer 340, or other component of presentation module 335, may also determine where to place the quotation in relation to the body of the text contained on the page. For example, the quotation and picture may be placed near the top of the page or somewhere in the middle of the page. Additionally, depending on the size of the picture or length of the quotation selected, various parts of the body of the text near where the quotation and picture are placed, may need to have narrower margins. An example of where the quotation and/or picture are placed on a page with a portion of the text having a narrower margin may be seen in FIG. 4 and FIG. 5.

When the page layout is complete, presentation 360 is created (e.g. webpage) that displays the text from one or more content items 303, along with one or more selected quotations in prominence. Other enhancements may be included, such as placing the passage under a selected picture (e.g. stock photograph). Under an embodiment, presentation 360 is a webpage that a user can download from an Internet site.

Page Layout

Figure 4:
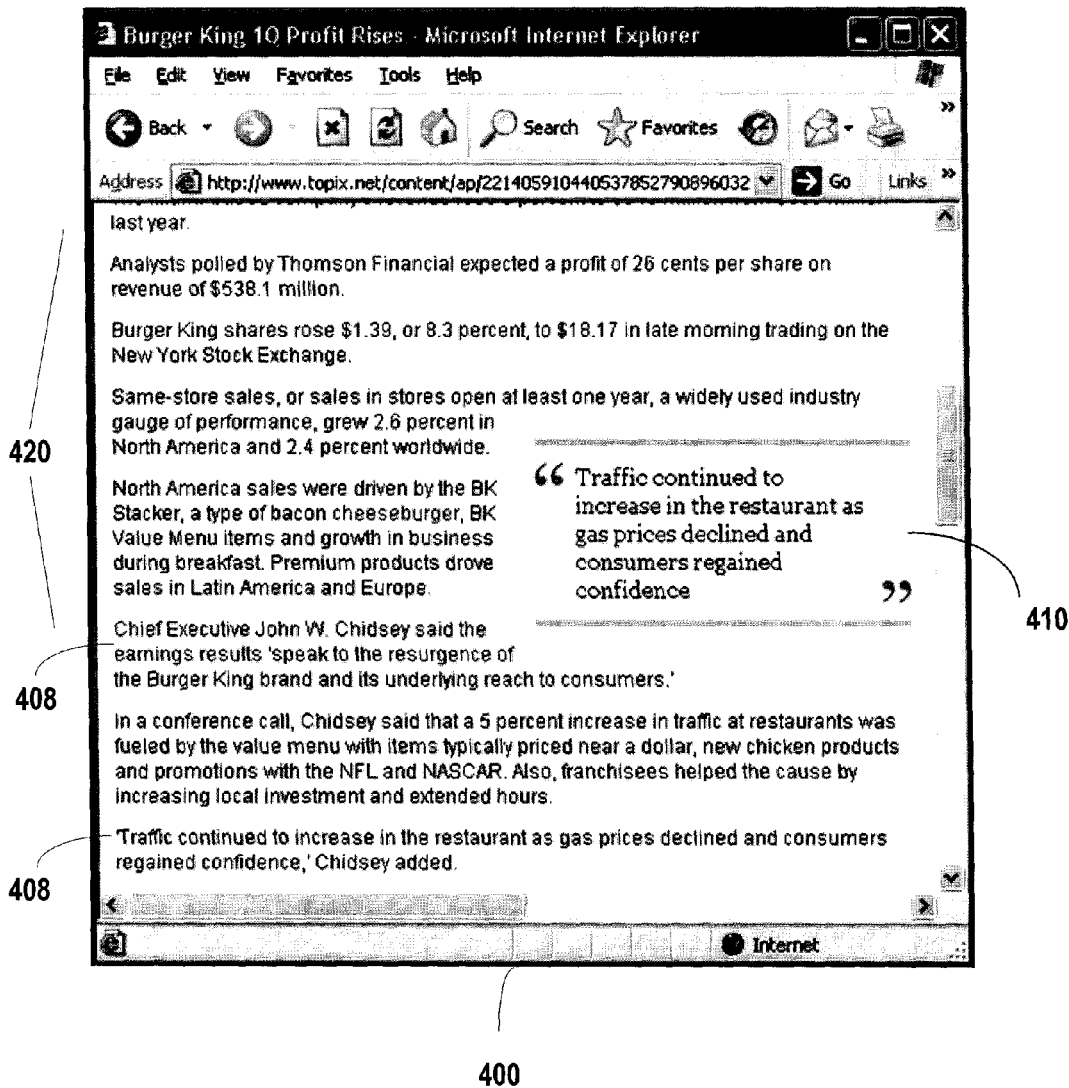
FIG. 4 and FIG. 5 illustrate presentations that can be generated with one or more embodiments described herein.
Figure 5:
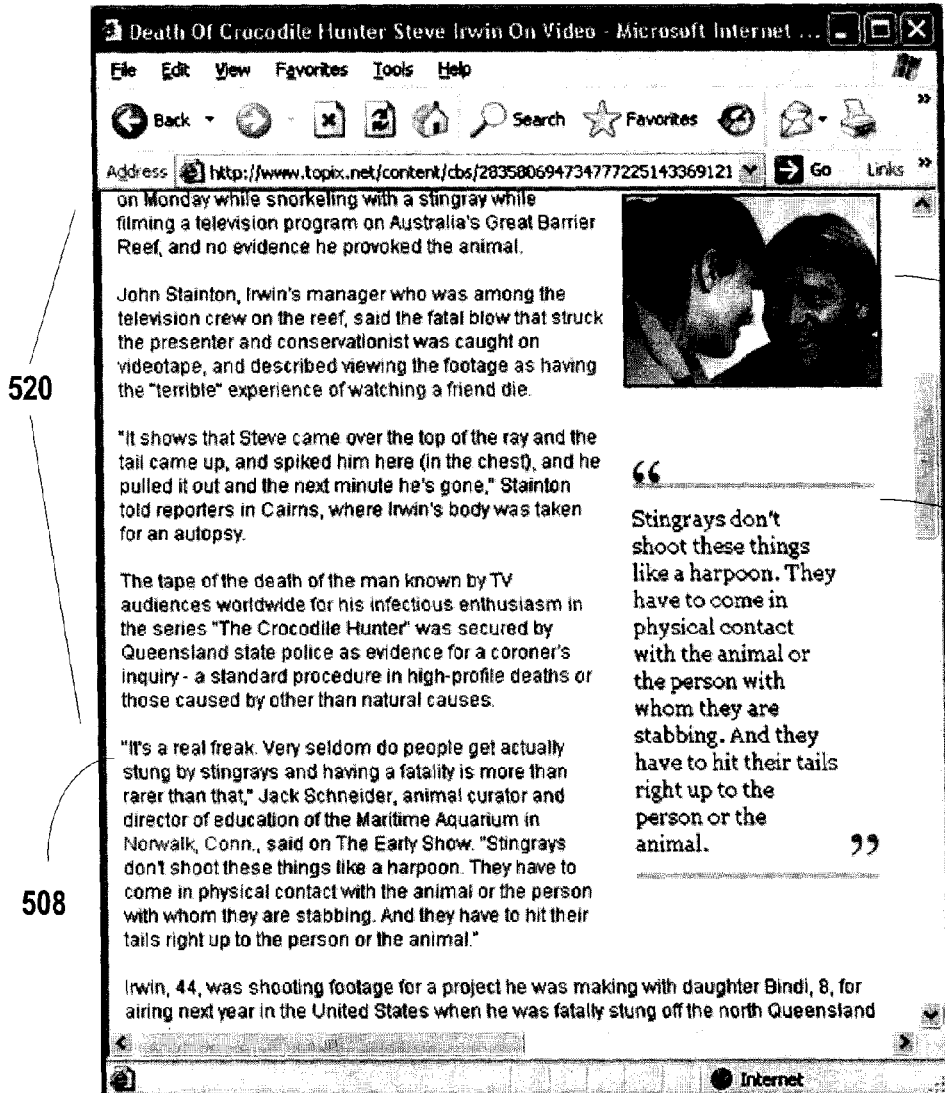

FIG. 4 and FIG. 5 illustrate presentations that can be generated with one or more embodiments described herein. In describing embodiments of FIG. 4 and FIG. 5, reference is made to elements of FIG. 3 for purpose of illustrating suitable components or modules for generating the presentation in the manner stated.

In FIG. 4, the presentation (as created by presentation module 335) is in the form of a webpage 400 that displays text content 420. The text content 420 may be copied or otherwise based on content of content items 303. The text content 420 includes multiple quotations 408, with one of the quotations being a prominently displayed quotation 410. As described with various embodiments, the selection of the quotation 410 for dominance may be based on various rules and factors, such as positioning, word count of the quotation(s), subject matter of the content and keywords in the quotation. The content 420 may be a re-presentation of a file or document contained in a network location. The prominently displayed quotation 410 may be enhanced by the quotation enhancer component 340, which may format, size and/or position the quotation in a suitable location with respect to the remainder of the content 420. In one embodiment, the quotation enhancer component 340 follows rules or guidelines to intelligently select how quotation 410 is to be prominently displayed.

FIG. 5 illustrates the presentation in the form of a webpage 500 that includes a selected image, under an embodiment of the invention. One (or more) quotations 510 may be selected from a content 520 of page 500 for prominence. The selected quotation 510 may be one of many quotations 508 contained in the content item 303. As described with various embodiments, the selection of the quotation 510 for dominance may be based on various rules and factors, such as positioning, word count of the quotation(s), subject matter of the content and keywords in the quotation. In addition, a picture 522 may be selected for display in connection (i.e. adjacent to) with the prominent quotation 510. In one embodiment, picture selector 345 (FIG. 3) may select the picture 522 so that it relates to the subject matter of the quotation 510. The opposite may also be implemented—the quotation 510 may be selected after the picture 522 is selected.

Alternative Embodiments

While embodiments described above provide processes, methods and systems that work in connection with an online content aggregator, one or more embodiments provide for a method such as described with FIG. 1 and elsewhere in this application to apply to word processing documents, and image files that display text (e.g. "pdf" files). It is even possible that source files are stored locally on a computer, so that embodiments are implemented on non-networked documents and other content items. In such alternative embodiments, the resulting presentation that places selected quotations in prominence may also be a similarly formatted document (either new or modified from the original document). For example, text from a word document may be scanned for quotations, and the document (or a new document) may be re-formatted to include selected quotations in some form of prominence. Examples of how such alternative embodiments may be implemented includes (i) an application that creates outlines or summaries based on identified and/or selected quotations in a document, and (ii) a publishing application that automatically creates a document with publishing formatting (e.g. per journalistic rules). Numerous other applications and alternatives may also be implemented.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for displaying text, the method comprising:
programmatically selecting a quotation of a third person from text of a content item, wherein the quotation is representative of a topic or theme of the content item, and wherein the selected quotation (i) comprises only a portion of the text of the content item, so that the text of the content item includes non-quotation content, (ii) is attributable to the third person who is not an author of the content item, and (iii) is programmatically deemed to be representative of the topic or theme of the content item; and
creating a presentation based, at least in part, on the text of the content item, wherein creating the presentation includes placing at least a portion of the selected quotation in prominence on the presentation, wherein placing at least the portion of the selected quotation in prominence on the presentation includes copying at least the portion of the quotation onto a region of the presentation that is separate from another region of the presentation where content from the text of the content item is displayed.

2. The method of claim 1, wherein programmatically selecting the quotation of the third person includes detecting one or more markers that indicate a location of the quotation in the text of the content item.

3. The method of claim 2, wherein detecting one or more markers that indicate the location of the quotation in the text of the content item includes determining a style of quotation markers for the content item.

4. The method of claim 3, wherein determining the style of quotation markers for the content item includes determining whether the content item utilizes a single quotation marker symbol or a double quotation marker symbol.

5. The method of claim 1, wherein copying at least the portion of the quotation onto the region of the presentation includes placing the quotation in proximity to a picture.

6. The method of claim 5, further comprising selecting the picture for use on the presentation from a collection of pictures.

7. The method of claim 1, wherein the presentation is a webpage.

8. The method of claim 1, wherein programmatically selecting the quotation of the third person includes selecting the quotation based at least in part on one or more of (i) a length of the quotation, (ii) a placement of the quotation in the text of the content item, and (iii) one or more words that are contained in the quotation.

9. The method of claim 1, further comprising selecting the quotation based in part on comparing one or more words contained in the quotation with subject matter of the text of the content item.

10. The method of claim 9, wherein comparing one or more words contained in the quotation with subject matter of the text of the content item includes at least one of (i) comparing the one or more words contained in the quotation to a title of the text of the content item, (ii) comparing the one or more words contained in the quotation to the text of the content item, and (iii) comparing the one or more words contained in the quotation with one or more keywords contained in the text of the content item.

11. The method of claim 1, wherein the text of the content item is content from an online source.

12. The method of claim 1, wherein programmatically selecting the quotation of the third person includes discarding from selection any quotation in which a number of words that are capitalized exceeds a designated threshold.

13. A computer implemented method for identifying a quotation in text content, the method comprising:
    selecting a quotation of a third person from text of a content item, wherein the quotation is representative of a topic or theme of the content item, and wherein the selected quotation (i) comprises only a portion of the text of the content item, so that the text of the content item includes non-quotation content, (ii) is attributable to the third person who is not an author of the content item, and (iii) is programmatically deemed to be representative of the topic or theme of the content item, wherein selecting a representative quotation is based, at least in part, on one or more markers that identify a location of the quotation; and
    displaying the quotation for prominence when displaying the text content or portions of the text content, wherein displaying the quotation for prominence includes copying at least a portion of the quotation onto a region of a presentation that is separate from another region of the presentation where content from the text of the content item is displayed.

14. The method of claim 13, wherein displaying the quotation for prominence includes creating the presentation in which the selected quotation is displayed in conjunction with the text of the content item.

15. The method of claim 14, wherein creating the presentation includes formatting the quotation based on one or more of (i) a number of words included in the selected quotation, (ii) a font size of the text of the content item, and (iii) a space available in the presentation for display of the selected quotation.

16. The method of claim 13, wherein selecting the quotation of the third person includes identifying one or more quotation markers in the text of the content item.

17. The method of claim 16, wherein the quotation markers include one or more of (i) a single quotation symbol, (ii) a double quotation symbol, (iii) a pair of bracket symbols identifying a string of words in the text of the content item, (iv) a paragraph indentation, (v) a text formatting of a string of words included in the text of the content item, and (vi) a paragraph spacing of a string of words in the text of the content item.

18. The method of claim 17, wherein the quotation markers include one or more of the single quotation symbol, and wherein selecting a representative quotation in a text of a content item includes determining that none of the one or more single quotation symbols are for a text contraction.

19. The method of claim 13, wherein selecting the quotation of the third person includes extracting a quotation that extends to two or more paragraphs.

20. The method of claim 13, wherein selecting the quotation of the third person includes extracting a quotation that is separated by an attribution.

21. The method of claim 13, wherein displaying the quotation for prominence includes using a set of rules or factors to determine which quotation is to be selected.

22. The method of claim 13, wherein selecting the quotation of the third person includes identifying a quotation separated by one or more of (i) line breaks, (ii) paragraph breaks, (iii) column breaks, or (iv) an attribution.

23. A non-transitory computer-readable medium carrying instructions for displaying text content, wherein the instructions, when executed by one or more processors, cause the one or more processors to perform steps comprising:
    selecting a quotation of a third person from text of a content item, wherein the quotation is representative of a topic or theme of the content item, and wherein the selected quotation (i) comprises only a portion of the text of the content item, so that the text of the content item includes non-quotation content, (ii) is attributable to the third person who is not an author of the content item, and (iii) is programmatically deemed to be representative of the topic or theme of the content item; and
    creating a presentation based at least in part on the text of the content item, wherein creating the presentation includes placing at least a portion of the selected quotation in prominence on the presentation, wherein placing at least a portion of the selected quotation in prominence on the presentation includes copying at least the portion of the quotation onto a region of the presentation that is separate from another region of the presentation where content from the text of the content item is displayed.

* * * * *